United States Patent
Ren et al.

(10) Patent No.: US 11,606,620 B2
(45) Date of Patent: Mar. 14, 2023

(54) METHOD AND DEVICE FOR ACQUIRING VIRTUAL RESOURCE AND STORAGE MEDIUM

(71) Applicant: BEIJING DAJIA INTERNET INFORMATION TECHNOLOGY CO., LTD., Beijing (CN)

(72) Inventors: Jiarui Ren, Beijing (CN); Ying Shu, Beijing (CN); Jiaying Shao, Beijing (CN); Dongyang Yin, Beijing (CN); Jia Feng, Beijing (CN); Yongsheng Wang, Beijing (CN); Yizhao Geng, Beijing (CN); Quanquan Zhang, Beijing (CN); Kelindun Xue, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/412,167

(22) Filed: Aug. 25, 2021

(65) Prior Publication Data

US 2022/0232288 A1 Jul. 21, 2022

Related U.S. Application Data

(63) Continuation of application No. 17/404,503, filed on Aug. 17, 2021, now abandoned.

(30) Foreign Application Priority Data

Jan. 15, 2021 (CN) .......................... 202110058040.1

(51) Int. Cl.
*H04N 21/4784* (2011.01)
*H04N 21/4788* (2011.01)
*H04N 21/482* (2011.01)

(52) U.S. Cl.
CPC ..... *H04N 21/4784* (2013.01); *H04N 21/4788* (2013.01); *H04N 21/482* (2013.01)

(58) Field of Classification Search
CPC ........... H04N 21/4784; H04N 21/4788; H04N 21/482; H04N 21/47202; H04N 21/2187; H04N 21/2743; H04N 21/8545
(Continued)

(56) References Cited

U.S. PATENT DOCUMENTS

| 9,101,836 B1 * | 8/2015 | Brenden | ................. A63F 13/48 |
| 2006/0058103 A1 * | 3/2006 | Danieli | .................... A63F 13/86 463/42 |

(Continued)

FOREIGN PATENT DOCUMENTS

WO WO-2020093901 A1 * 5/2020 ......... H04N 21/2187

OTHER PUBLICATIONS

Netzorg, Robert et al., PopFactor: Live-Streamer Behavior and Popularity, Sep. 2018, ICWSM, Association for the Advancement of Artificial Intelligence, www.aaai.org (Year: 2018).*

(Continued)

*Primary Examiner* — Cynthia M Fogg
(74) *Attorney, Agent, or Firm* — Foley & Lardner LLP

(57) ABSTRACT

The present disclosure relates to systems, methods, and non-transitory computer-readable media for acquiring a virtual resource, including displaying an interactive interface of a second user in response to an access request of a first user for the interactive interface of the second user. A virtual resource state control is displayed on the interactive interface. A preview interface of a target multimedia resource posted by the second user is played in response to a trigger operation on the virtual resource state control by the first user in a case where the virtual resource state control indicates an available state. A preset quantity of virtual (Continued)

resources from virtual resources associated with the target multimedia resource is acquired in response to a trigger operation on the preview interface by the first user.

18 Claims, 12 Drawing Sheets

(58) Field of Classification Search
USPC .......................................................... 725/33
See application file for complete search history.

(56) References Cited

U.S. PATENT DOCUMENTS

| | | | | |
|---|---|---|---|---|
| 2016/0189198 | A1* | 6/2016 | McKenzie | G06Q 30/0276 705/14.41 |
| 2017/0006322 | A1* | 1/2017 | Dury | H04N 21/254 |
| 2019/0184283 | A1* | 6/2019 | Kim | A63F 13/352 |
| 2019/0238488 | A1 | 8/2019 | Peng et al. | |
| 2019/0268662 | A1* | 8/2019 | Payzer | H04N 21/44204 |
| 2019/0297385 | A1* | 9/2019 | Park | H04N 21/25866 |
| 2020/0016495 | A1* | 1/2020 | Cruz | A63F 13/48 |
| 2020/0351560 | A1* | 11/2020 | Kiyooka | H04N 21/4756 |
| 2021/0266631 | A1* | 8/2021 | Geng | H04N 21/431 |
| 2021/0366056 | A1* | 11/2021 | DiNunzio | G06Q 30/0208 |

OTHER PUBLICATIONS

Y. Chen and F. Xiong, "The Business Model of Live Streaming Entertainment Services in China and Associated Challenges for Key Stakeholders," in IEEE Access, vol. 7, pp. 116321-116327, 2019, doi: 10.1109/ACCESS.2019.2935005. (Year: 2019).*

Extended European Search Report dated Feb. 23, 2022, from application No. 21193129.0, 8 pages.

* cited by examiner

METHOD AND DEVICE FOR ACQUIRING VIRTUAL RESOURCE AND STORAGE MEDIUM

CROSS-REFERENCE TO RELATED APPLICATIONS

This application is a continuation of U.S. application Ser. No. 17/404,503, filed Aug. 17, 2021, which claims priority to Chinese Patent Application No. 202110058040.1, filed on Jan. 15, 2021, which are incorporated herein by reference in their entirety.

TECHNICAL FIELD

The present disclosure relates to the field of computer technologies, and in particular, to acquiring a virtual resource.

BACKGROUND

With the development of computer technologies, some terminal interactive applications provide users with video production functions. The users can publish videos such as short videos produced by themselves and live broadcast, through the interactive application platform, those videos to other users on the interactive application platform, such as follower users of the video-posting user, to browse. In addition, the videos posted on the interactive application platform may increase the number of followers of the video-posting user.

SUMMARY

The present disclosure provides systems, methods, and non-transitory computer-readable media for acquiring a virtual resource.

According to some arrangements of the present disclosure, a method for acquiring a virtual resource includes in response to an access request of a first user for an interactive interface of a second user, displaying the interactive interface of the second user. A virtual resource state control is displayed on the interactive interface. A preview interface of a target multimedia resource posted by the second user is displayed in response to a trigger operation on the virtual resource state control by the first user in a case where the virtual 4817-6336-0504.2 resource state control indicates an available state. A preset quantity of virtual resources from virtual resources associated with the target multimedia resource is acquired in response to a trigger operation on the preview interface by the first user.

According to some arrangements of the present disclosure, a device for acquiring a virtual resource includes an interactive interface display unit configured to display an interactive interface of a second user in response to an access request of a first user for the interactive interface of the second user. A virtual resource state control is displayed on the interactive interface. The device further includes a preview interface display unit configured to display a preview interface of a target multimedia resource posted by the second user in response to a trigger operation on the virtual resource state control by the first user in a case where the virtual resource state control indicates an available state. The device further includes a virtual resource acquiring unit configured to acquire a preset quantity of virtual resources from virtual resources associated with the target multimedia resource in response to a trigger operation on the preview interface by the first user.

According to some arrangements of the present disclosure, an electronic device, includes a processor; and a memory for storing instructions executable by the processor. The processor is configured to execute the instructions to implement any method disclosed herein for acquiring the virtual resource.

According to some arrangements of the present disclosure, there is provided a computer storage medium having stored therein instructions which, when being executed by a processor of an electronic device, cause the electronic device to perform the method for acquiring the virtual resource described in any of the foregoing implementations.

According to a fifth aspect of the arrangements of the present disclosure, there is provided a computer program product having a computer program/instructions which, when executed by a processor, implements any method disclosed herein for acquiring the virtual resource.

It should be noted that the above general description and the following detailed description are merely examples and explanatory, and should not be construed as limiting of the disclosure.

BRIEF DESCRIPTION OF THE DRAWINGS

The accompanying drawings, which are incorporated in and constitute a part of this disclosure, illustrate arrangements consistent with the present disclosure and, together with the description, serve to explain the principles of the present disclosure, and do not constitute an improper limitation of the disclosure.

DETAILED DESCRIPTION

In order to enable those of ordinary skilled in the art to better understand the technical solutions of the present disclosure, the technical solutions in arrangements of the present disclosure will be described clearly and completely with reference to the accompanying drawings.

It should be noted that the terms "first" and "second" in the specification and claims of the present disclosure and the above-mentioned drawings are used to distinguish similar objects, and are not necessarily used to describe a specific order or sequence. It should be understood that the data used in this way can be interchanged under appropriate circumstances so that the arrangements of the present disclosure described herein can be implemented in an order other than those illustrated or described herein. The implementations set forth in the following example arrangements do not represent all implementations consistent with the present disclosure. Instead, they are merely examples of apparatuses and methods consistent with aspects related to the present disclosure as recited in the appended claims.

Figure 1:
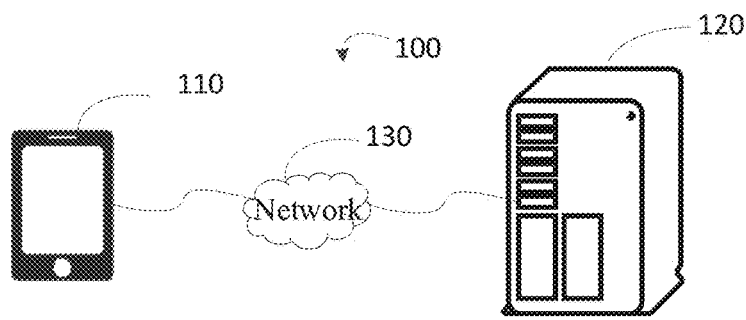
FIG. 1 is a diagram showing an application environment of a method for acquiring a virtual resource according to an example arrangement.

FIG. 1 shows a diagram of an application environment 100 $_{[YG1]}$for acquiring a virtual resource according to an example arrangement. The application environment 100 may include a terminal 110 and a server 120.

The terminal 110 may be, but is not limited to, a smart phone, a tablet computer, a notebook computer, a desktop computer, etc. An interactive application that supports a multimedia resource production function may be installed and run in the terminal 110. The interactive application may include a live broadcast application, a short video application, a social application, etc., that can be executed on the terminal 110 and other terminals such as but not limited to, the terminal 110. The multimedia resources may include videos, audios, and so on. A user of the terminal 110 may log in to the interactive application through pre-registered user information, and the user information may include an account and a password.

The server 120 provides backend services for the interactive application, such as storing multimedia resources posted by individual users in the interactive application and providing the same to other users. The multimedia resource posted by the user through the interactive application may include a multimedia resource associated with a virtual resource, and the virtual resource associated with the multimedia resource can be acquired through a preview interface of the multimedia resource associated with the virtual resource. The virtual resource may include a virtue currency associated with the interactive application for reward purposes, such as a "gold coin," a "gold bean," a point, etc. In some arrangements, the multimedia resource can be associated with a virtual resource package which includes a certain quantity of virtual resources. The certain quantity of virtual resources can be sourced from a first quantity of virtual resources added by a poster, or from a second quantity of virtual resources sent by the interactive application platform, or from a sum of the first quantity of virtual resources added by the poster and the second quantity of virtual resources sent by the interactive application platform. In some arrangements, the preview page of the multimedia resource associated with the virtual resource package may be provided with a virtual resource acquisition control for acquiring the associated virtual resources.

The server 120 may be an independent physical server, or a server cluster or distributed system composed of multiple physical servers, or it may be one or more cloud servers that provides basic cloud computing services such as cloud services, cloud databases, cloud computing, cloud functions, cloud storage, network services, cloud communications, middleware services, domain name services, security services, content delivery networks (CDNs), big data and artificial intelligence platforms, and so on. The terminal 110 may be directly or indirectly connected to the server 120 through wired or wireless communication, which is not limited in the present disclosure.

Figure 2:
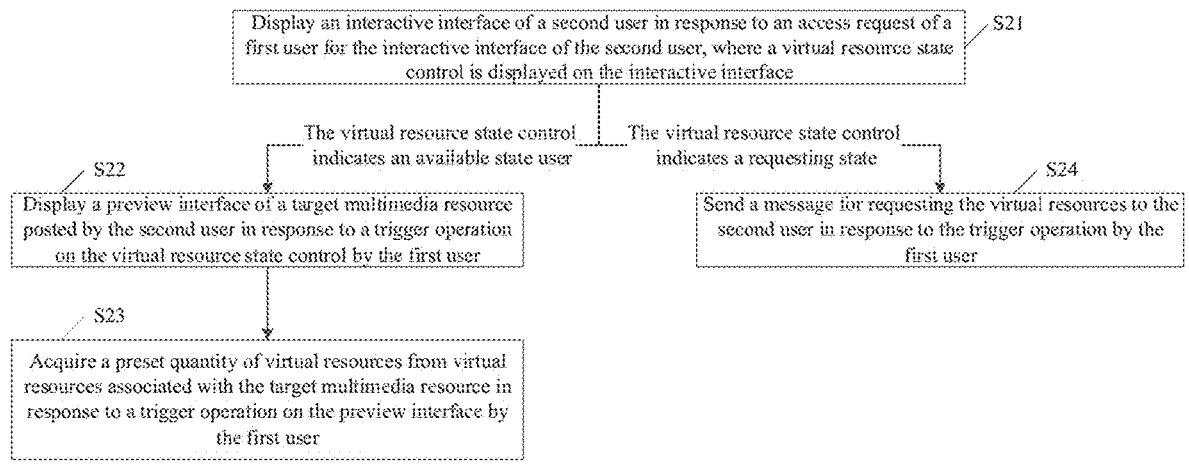
FIG. 2 is a flowchart showing a method for acquiring a virtual resource according to an example arrangement.

The virtual resource may be acquired by an electronic device, and the electronic device may be a terminal or a server, or the terminal and the server. FIG. 2 is a flowchart showing an example method for acquiring a virtual resource according to an example arrangement. FIG. 2 is described with respect to the application environment 100 shown in FIG. 1 to which the method for acquiring the virtual resource can be applied.

At S21, in response to an access request of a first user for an interactive interface of a second user, the interactive interface of the second user is displayed, where a virtual resource state control is displayed on the interactive interface.

Figure 3A:
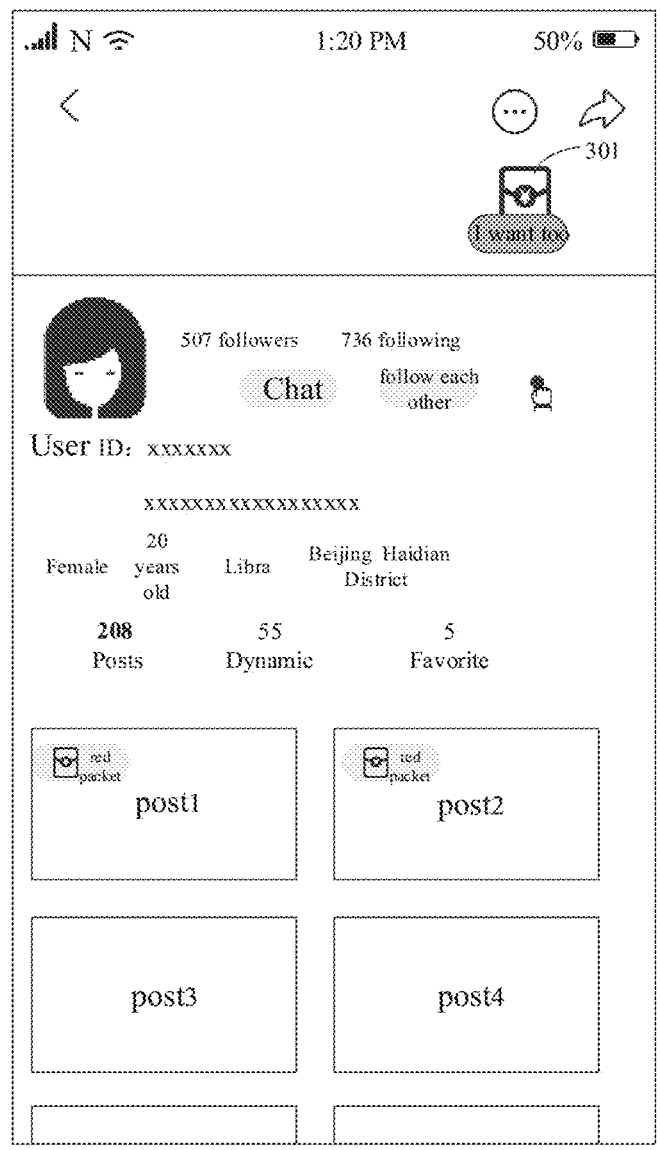
FIG. 3*a* is a schematic diagram showing an interactive interface of a second user including a virtual resource state control indicating an available state according to an example arrangement.

In some arrangements, the interactive interface of the second user may be a personal homepage of the second user as shown in FIG. 3a which is a schematic diagram of the interactive interface of the second user in which the virtual resource state control 301 is displayed on the personal homepage of the second user.

Figure 3B:
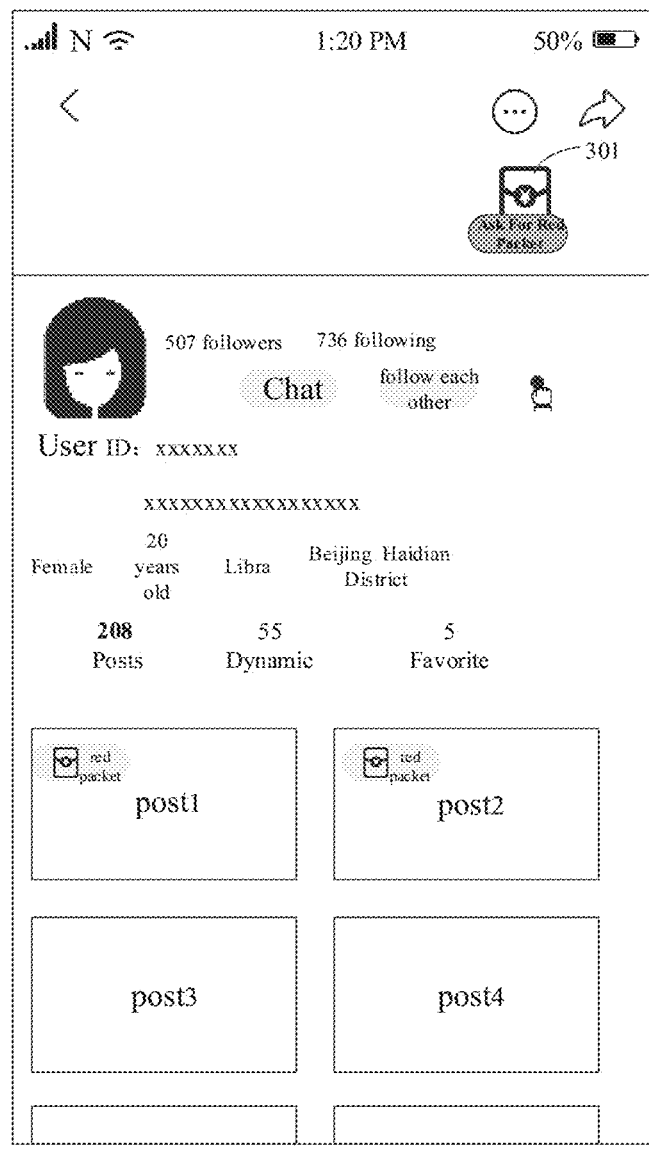
FIG. 3*b* is a schematic diagram showing an interactive interface of a second user including a virtual resource state control indicating a virtual resource requesting state according to an example arrangement.

In some arrangements of the present disclosure, the virtual resource state control can indicate an available state and a requesting state. If the virtual resource state control indicates the available state, it indicates that the second user has posted the multimedia resource associated with the virtual resource. If the virtual resource state control indicates the requesting state, it indicates that the second user has not yet posted the multimedia resource associated with the virtual resource. In some arrangements, a text description, an icon, etc. can be added to the virtual resource state control to indicate the available state or the requesting state. Taking an electronic red packet as an example, the text "I want too" can be added on a red packet control to indicate the available state, as shown in FIG. 3a. When the first user taps on the red packet control with the added text "I want too", it proceeds to S22. The text "Ask for Red Packet" can be added on the red packet control to indicate the red packet requesting state, as shown in FIG. 3b. When the user taps on the red packet control with the added text "Ask for Red packet", it proceeds to S24.

Figure 4:
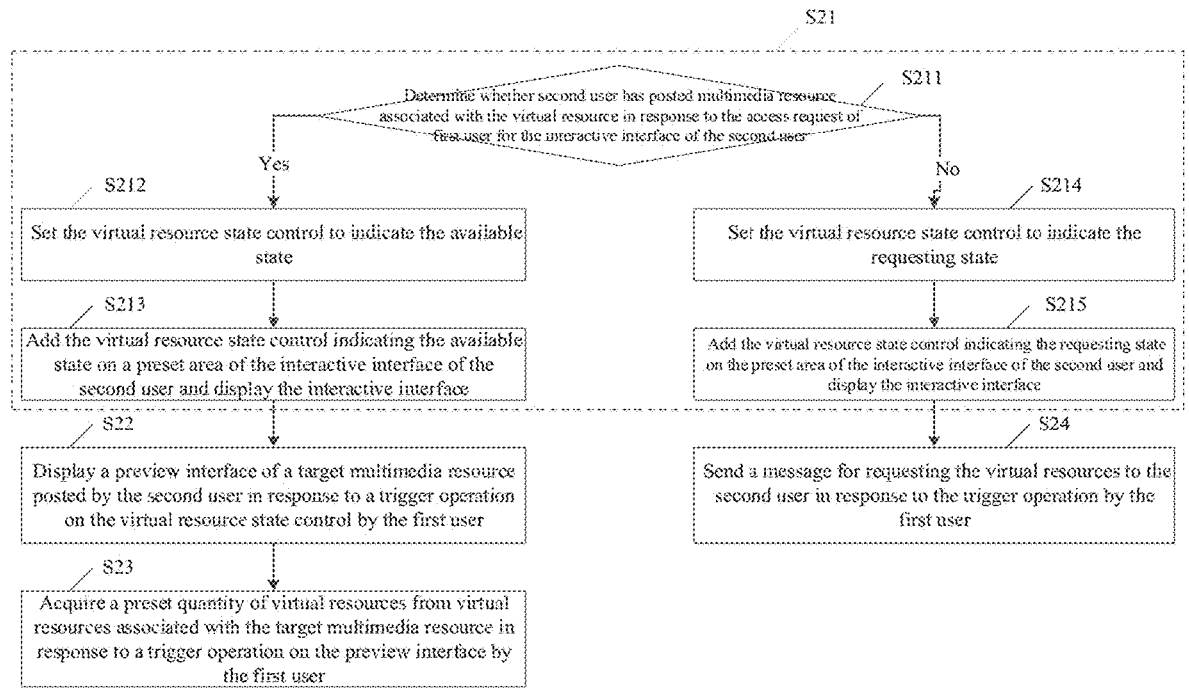
FIG. 4 is a flowchart showing another method for acquiring a virtual resource according to an example arrangement.

In some arrangements, the S21 may include the following steps as shown in FIG. 4.

At S211, it is determined whether the second user has posted the multimedia resource associated with the virtual resource in response to the access request of the first user for the interactive interface of the second user.

In some arrangements, historical posting information of the second user can be searched. In a case where there is a posting record of the multimedia resource associated with the virtual resource in the historical posting information, it can be determined that the second user has posted the multimedia resource associated with the virtual resource, and S212 can performed; and in a case where there is no posting record of the multimedia resource associated with the virtual resource in the historical posting information, it can be determined that the second user has not posted the multimedia resource associated with the virtual resource, and S214 can be performed.

At S212, the virtual resource state control is set to indicate the available state in a case that the second user has posted the multimedia resource associated with the virtual resource.

At S213, the virtual resource state control indicating the available state is added on a preset area of the interactive interface of the second user, and the interactive interface is displayed.

The preset area can be determined according to a content layout in the interactive interface of the second user. As shown in FIGS. 3a and 3b, the virtual resource state control can be displayed on an upper part of the personal homepage.

Figure 5A:
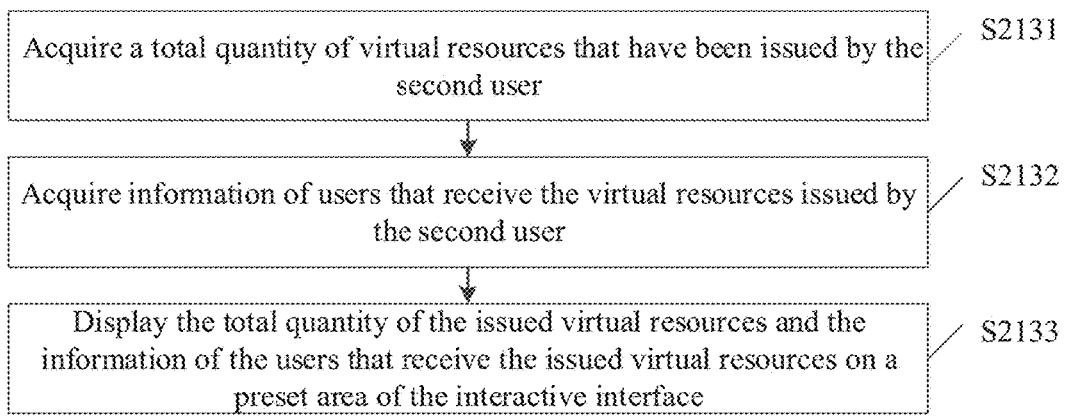
FIG. 5*a* is a flowchart of adding a virtual resource state control indicating an available state on a preset area of an interactive interface of a second user according to an example arrangement.

In order to stimulate the first user's initiative to acquire the virtual resource, as shown in FIG. 5a, in some arrangements, S213 may further include the following.

At S2131, a total quantity of virtual resources that have been issued by the second user is acquired.

At S2132, information of users that receive the virtual resources issued by the second user is acquired.

In some arrangements, the information of the user that receives the virtual resources issued by the second user may be an avatar of the user receiving the virtual resources. In some arrangements, only avatars of a preset number of users who have recently received the virtual resources may be acquired. The preset number can be set according to actual needs, for example, the preset number can be three.

At S2133, the total quantity of the issued virtual resources and the information of the users receiving the issued virtual resources are displayed on the preset area of the interactive interface.

In some arrangements, a virtual resource widget can be generated based on the total quantity of the issued virtual resources, the information of the users receiving the issued virtual resources and the virtual resource state control indicating the available state. In the generated virtual resource widget, the total quantity of virtual resources that have been issued by the second user can be displayed in a copywriting form, and the information of the users receiving the issued virtual resources and the virtual resource state control indicating the available state can be displayed. It should be understood that other content elements can be added to the widget as desired, for example, the number of followers receiving the virtual resources issued by the second user can also be included.

Figure 5B:
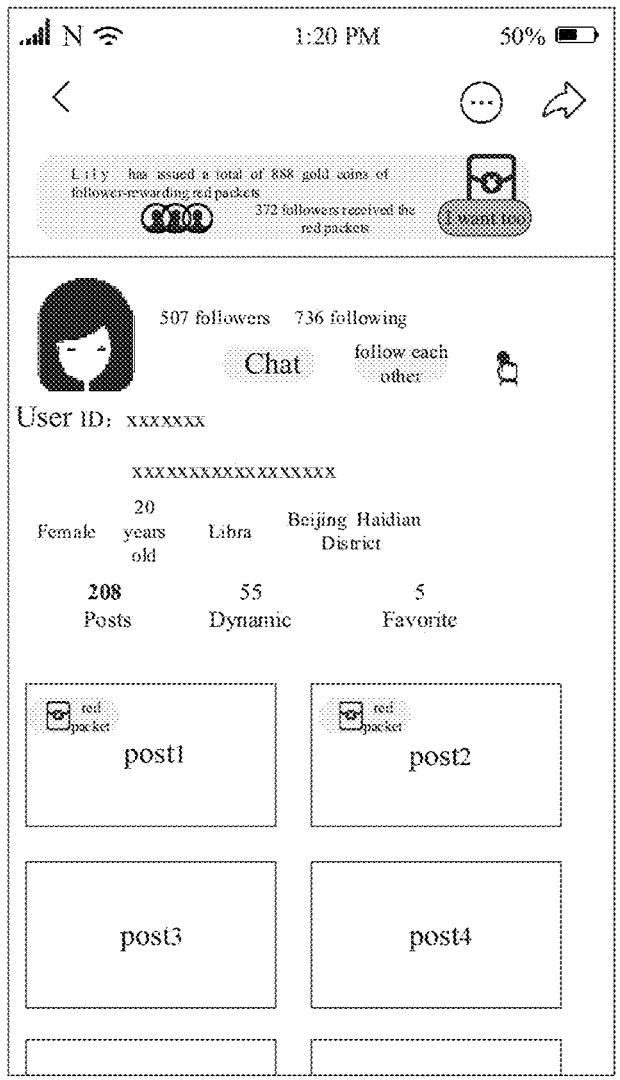
FIG. 5*b* is a schematic diagram showing a display of a red packet widget on a personal homepage according to an example arrangement.

Taking the red packet widget as an example, FIG. 5b is a schematic diagram of a display of a red packet widget on a personal homepage. The red packet widget includes a red packet state control indicating the available state and avatars of the last three followers who received follower-rewarding red packets which refer to electronic red packets associated with the video. The copywriting of "Lily has issued a total of 888 gold coins of follower-rewarding red packets" shows the total quantity of gold coins in the follower-rewarding red packets issued by the second user "Lily", and the copywriting of "372 followers have received the red packets" shows the number of followers who receive the gold coins in the follower-rewarding red packets of the second user "Lily".

Through the above solution, the first user can immediately be aware of a specific situation of the virtual resource associated with the multimedia resource posted by the second user when accessing the interactive interface of the second user.

At S214, the virtual resource state control is set to indicate the requesting state in a case that the second user has not posted the multimedia resource associated with the virtual resource.

At S215, the virtual resource state control indicating the requesting state is added on the preset area of the interactive interface of the second user, and the interactive interface is displayed.

At S22, a preview interface of a target multimedia resource posted by the second user is displayed in response to a trigger operation on the virtual resource state control by the first user in a case where the virtual resource state control indicates the available state.

Figure 6:
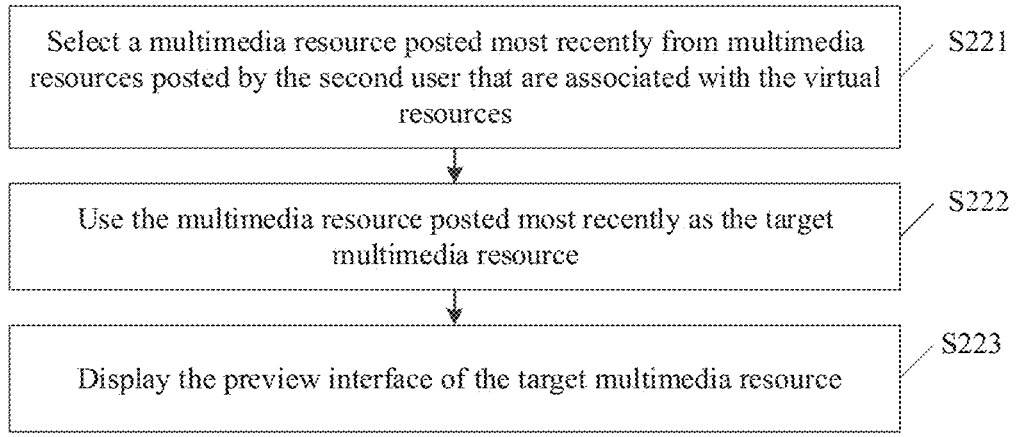
FIG. 6 is a flowchart of displaying a preview interface of a target multimedia resource according to an example arrangement.

The target multimedia resource may be any multimedia resource from the multimedia resources posted by the second user that are associated with the virtual resource, and the preview interface of the target multimedia resource may be a detail page of the target multimedia resource. In order to facilitate the first user to browse the multimedia resources recently posted by the second user, in some arrangements, S22 may include the following as shown in FIG. 6.

At S221, a multimedia resource posted most recently is selected from the multimedia resources posted by the second user that are associated with the virtual resources.

At S222, the multimedia resource posted most recently is used as the target multimedia resource.

At S223, the preview interface of the target multimedia resource is displayed.

The preview interface may include a virtual resource acquisition control used for acquiring the virtual resource associated with the target multimedia resource. In some arrangements, in order to improve the user's interest and experience, the multimedia resource posted most recently may be a multimedia resource posted most recently for which the quantity of associated virtual resources satisfies a preset condition, for example, a multimedia resource posted most recently for which the quantity of currently associated virtual resources is greater than 0.

At S23, a preset quantity of virtual resources are acquired from virtual resources associated with the target multimedia resource in response to the trigger operation on the preview interface by the first user.

Figure 7:
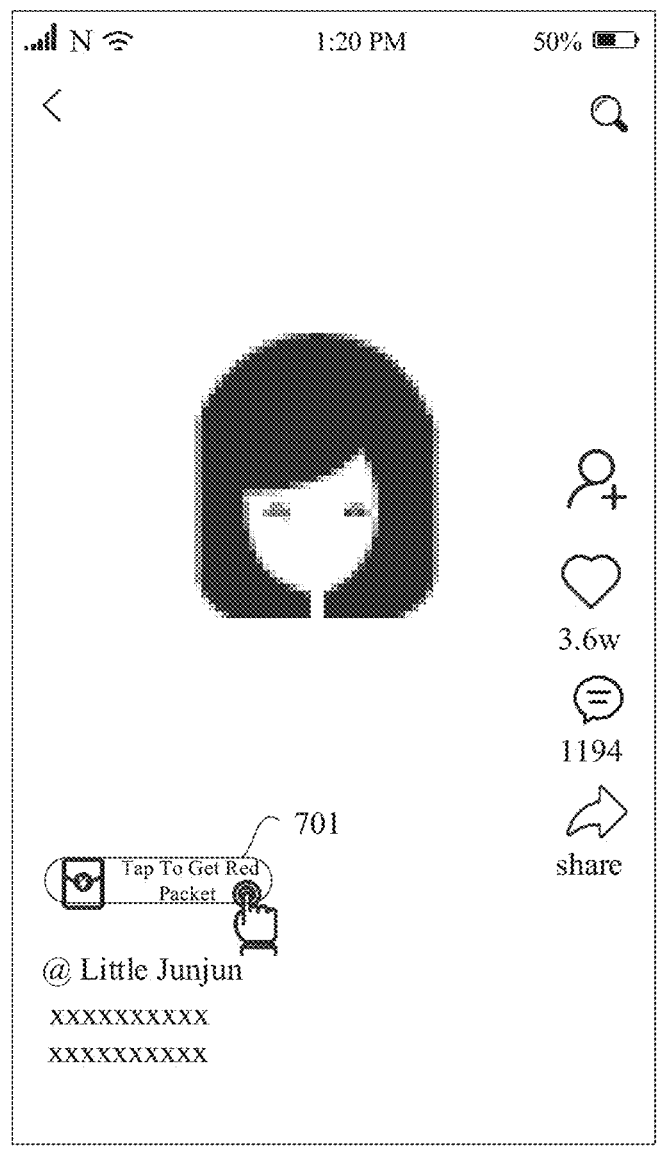
FIG. 7 is a schematic diagram showing a display of a video detail page displaying a red packet acquisition control according to an example arrangement.
Figure 8:
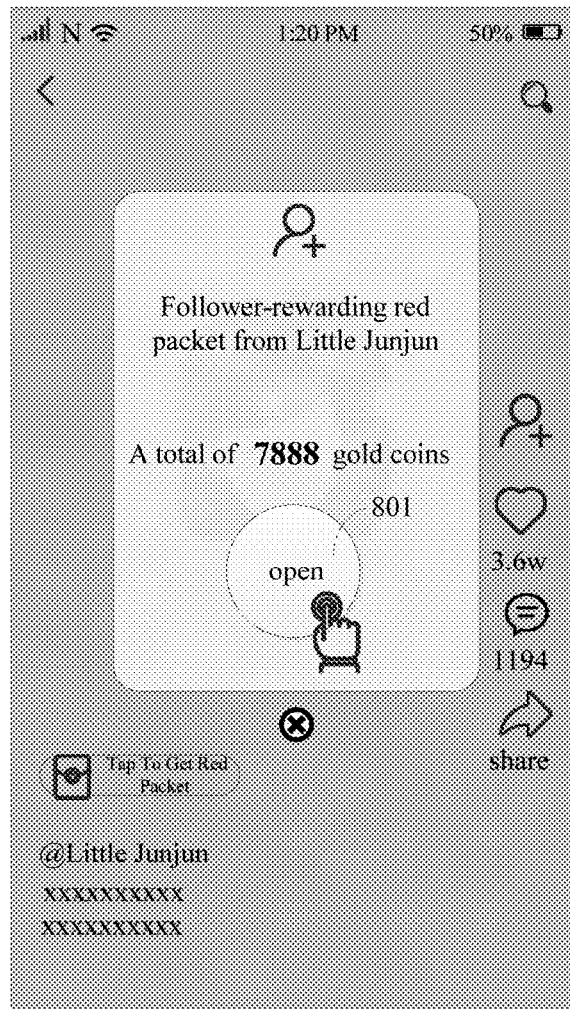
FIG. 8 is a schematic diagram showing a display of a red packet acquisition interface according to an example arrangement.

In some arrangements, the preview interface may include the virtual resource acquisition control used for acquiring the virtual resource associated with the target multimedia resource. Taking the electronic red packet as an example, a red packet acquisition control "tap to get red packet" 701 is displayed in the video detail page as shown in FIG. 7. When the first user triggers (such as tapping, long-pressing, etc.) the virtual resource acquisition control, the preset quantity of virtual resources can be acquired from the virtual resources associated with the target multimedia resource. In some arrangements, when the first user triggers the virtual resource acquisition control, the preset quantity of virtual resources can be directly acquired. In some arrangements, a virtual resource acquisition interface can be displayed first, and the virtual resource acquisition interface includes a control related to a virtual resource acquisition instruction, so that in response to the trigger operation on the control related to the virtual resource acquisition instruction by the first user, the preset quantity of virtual resources can be acquired from the virtual resources associated with the target multimedia resource. The preset quantity may be a random quantity of virtual resources associated with the target multimedia resource. FIG. 8 shows a red packet acquisition interface entered after the first user taps the red packet acquisition control "tap to get red packet" shown in FIG. 7. The red packet acquisition interface includes a control 801 "open". When the first user taps the control 801, a red packet acquisition instruction can be sent, so that a preset quantity of gold coins can be acquired from the gold coins associated with the current video.

In some arrangements, in order to further increase the number of followers of the second user, only followers of the second user can be allowed to acquire the virtual resources in the virtual resource acquisition interface. If the first user is not currently a follower of the second user, he/she is not allowed to acquire the virtual resource. Only when the first user follows the second user and becomes a follower thereof, he/she can acquire the virtual resource. Accordingly, when acquiring the preset quantity of virtual resources from the virtual resources associated with the target multimedia resource at S23, it may be determined whether the first user satisfies a second preset condition. When the first user satisfies the preset condition, the preset quantity of virtual resources are acquired from the virtual resources associated with the target multimedia resource. The second preset condition may be that following state information of the first user with respect to the second user is already following.

In some arrangements, the following state information of the first user with respect to the second user can be acquired. The control related to the virtual resource acquisition instruction in the virtual resource acquisition interface is set to a trigger-enabled state in a case that the following state information indicates a following state, thus allowing trigger by the first user to acquire the preset quantity of virtual resources from the virtual resources associated with the target multimedia resource; and the control related to the virtual resource acquisition instruction in the virtual resource acquisition interface is set to a trigger-disabled state in response to the following state information indicates a un-following state, thus not allowing the current first user to acquire the preset quantity of virtual resources from the virtual resources associated with the target multimedia resource.

In some arrangements, a following control can also be displayed in the virtual resource acquisition interface in a case that the following state information indicates the un-following state, so that the first user becomes the follower of the second user in response to the trigger operation on the following control by the first user to follow the second user. The control related to the virtual resource acquisition instruction in the virtual resource acquisition interface is set to the trigger-enabled state in response to the following state information of the first user with respect to the second user indicates the following state, thus allowing the first user as the follower to acquire the virtual resource.

In some arrangements, in a case where the first user does not satisfy the preset condition, a prompt message prompting the first user to follow the second user may be displayed in response to the trigger operation of the first user on the virtual resource acquisition control in the preview interface, thus prompting the first user to follow the second user to become the follower of the second user.

Figure 9:
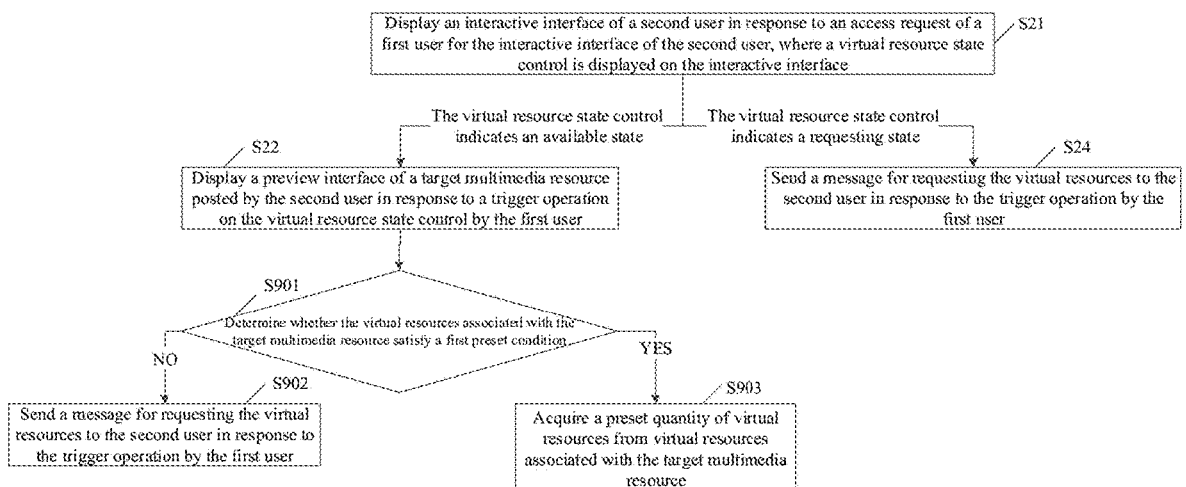
FIG. 9 is a flowchart showing another method for acquiring a virtual resource according to an example arrangement.

In some arrangements, in order to enrich the interaction manner, to further enhance the interest in acquiring the virtual resource associated with the multimedia resource, and to increase the probability that the first user can acquire the associated virtual resource when accessing the interactive interface of the second user, the S23 of acquiring the preset quantity of virtual resources from the virtual resources associated with the target multimedia resource in response to the trigger operation on the preview interface by the first user may include the following as shown in FIG. 9.

At S901, it is determined whether the virtual resources associated with the target multimedia resource satisfy a first preset condition.

The first preset condition may be that the quantity of associated virtual resources exceeds a preset quantity threshold which can be set according to actual needs. For example, the preset quantity threshold can be 0, that is, in a case that the quantity of virtual resources associated with the target multimedia resource exceeds 0, the virtual resource acquisition interface is displayed, that is, the first preset condition is satisfied in a case where there are still virtual resources that have not been acquired in a virtual resource package associated with the target multimedia resource.

At S902, a message for requesting the virtual resources is sent to the second user in response to the trigger operation by the first user in a case where the virtual resources associated with the target multimedia resource do not satisfy the first preset condition.

The message is used for prompting the second user to issue the virtual resources. The trigger operation of the first user may be a trigger operation on the virtual resource acquisition control in the preview interface, or a trigger operation on the control related to the virtual resource acquisition instruction in the virtual resource acquisition interface.

In actual applications, due to continuous acquisition of the virtual resources associated with the multimedia resources by the users, the virtual resources associated with the multimedia resources are dynamically changing. As a result, after the first user triggers the preview interface of the target multimedia resource, there may be a situation where the virtual resources associated with the target multimedia resource do not satisfy the first preset condition. In the arrangements of the present disclosure, in a case where the virtual resources associated with the target multimedia resource do not satisfy the first preset condition, the message for requesting the virtual resources can be sent to the second user in response to the trigger operation of the first user, so as to improve the probability and experience effect for the first user to acquire the virtual resources.

In some arrangements, request prompt information of the virtual resource may be displayed in response to the trigger operation of the first user in a case where the virtual resources associated with the target multimedia resource do not satisfy the first preset condition. The request prompt information is used for prompting whether to request the virtual resource from the second user. The message for requesting the virtual resources is generated in response to receiving an instruction to request the virtual resource from the second user, and the message is sent to a terminal corresponding to the second user, so that the terminal corresponding to the second user displays the message.

Figure 10:
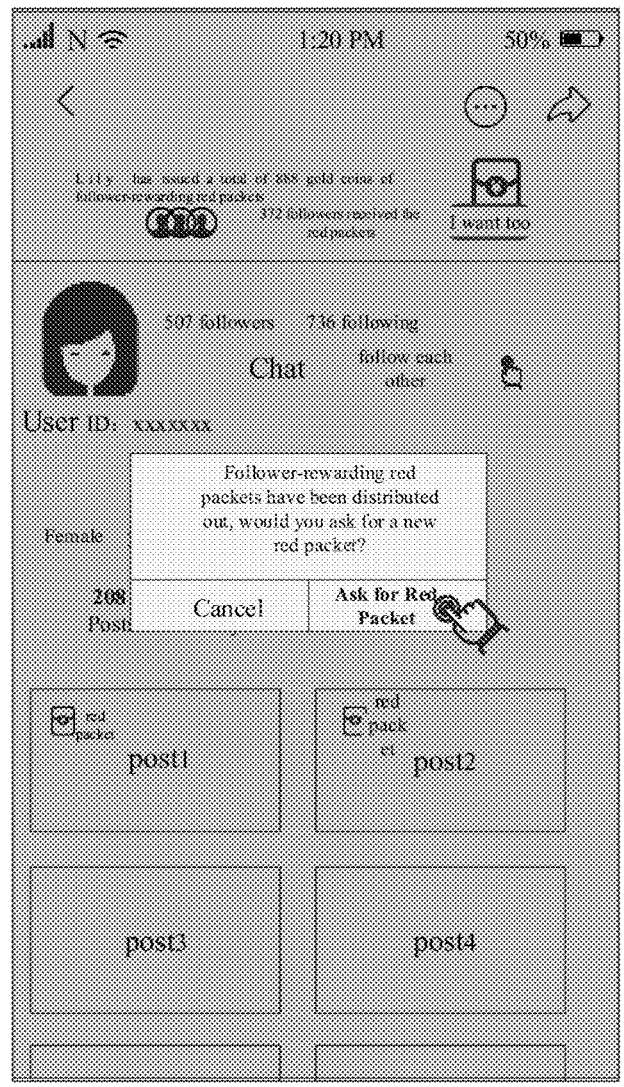
FIG. 10 is a schematic diagram showing a display of prompt information of a virtual resource request according to an example arrangement.
Figure 11:
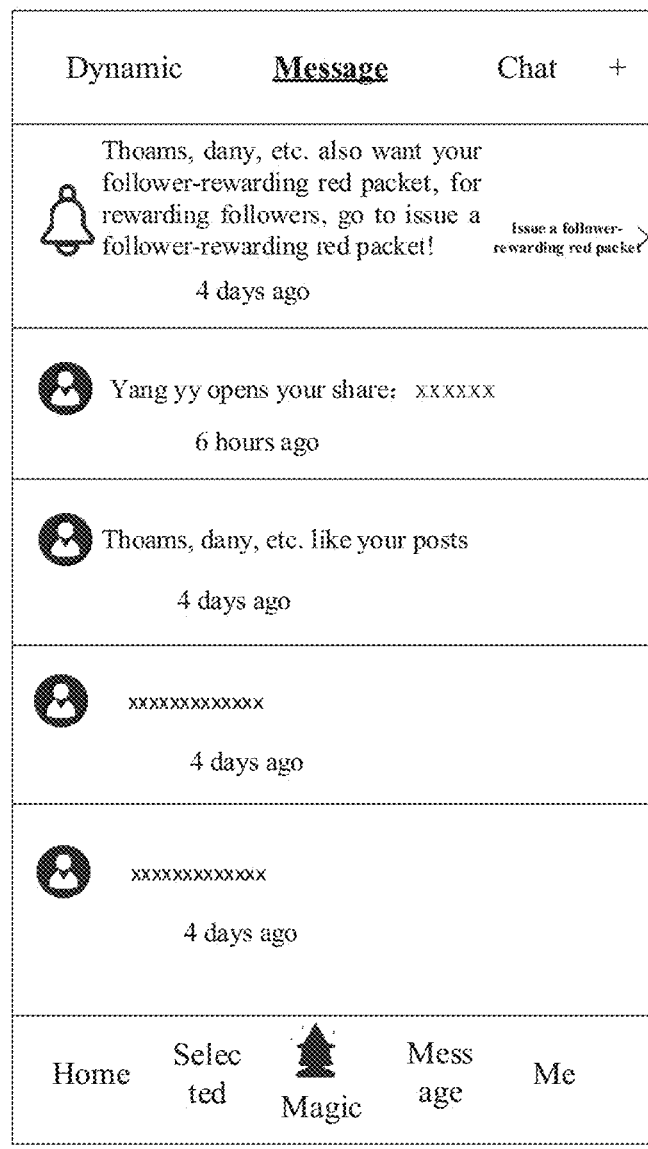
FIG. 11 is a schematic diagram showing a display of a message for requesting a red packet on a second user terminal according to an example arrangement.

FIG. 10 is a schematic diagram showing a display of request prompt information of a virtual resource. After the first user taps the control 801 "open" in FIG. 8, if the quantity of gold coins associated with the current video does not satisfy the first preset condition, for example, the gold coins in the follower-rewarding red packets associated with the current video have all been distributed out, a notifying pop-up window shown in FIG. 10 can pop up, displaying "the follower-rewarding red packets have been distributed out, would you like to ask for a new red packet?", with two options "Cancel" and "Ask for Red packet" displayed at the same time. If the first user taps on "Ask for Red packet", a red packet request message can be generated and is sent to the terminal corresponding to the second user, so that the terminal corresponding to the second user can display the red packet request message on a message page of the interactive application in the form of a message. FIG. 11 is a schematic diagram of a red packet request message displayed on a terminal corresponding to a second user, so that the second user can publish a work with the red packet when seeing the red packet request message.

At S903, the preset quantity of virtual resources are acquired from the virtual resources associated with the target multimedia resource in a case that the virtual resources associated with the target multimedia resource satisfy the first preset condition.

Through the above solutions, the fun in acquiring the virtual resources associated with the multimedia resources can be improved, and the probability that the first user can acquire the associated virtual resources when accessing the interactive interface of the second user can be increased.

At S24, the message for requesting the virtual resources is sent to the second user in response to the trigger operation by the first user in a case where the virtual resource state control indicates the requesting state.

The message is used for prompting the second user to issue the virtual resources, and the trigger operation by the first user may be the trigger operation by the first user on the virtual resource state control.

In some arrangements, the request prompt information of the virtual resource may be displayed in response to the trigger operation by the first user on the virtual resource state control in a case where the virtual resource state control in the interactive interface indicates the requesting state. The request prompt information is used for prompting whether to request the virtual resource from the second user. The message for requesting the virtual resources is generated in response to receiving an instruction to request the virtual resources from the second user, and the message is sent to a terminal corresponding to the second user, so that the terminal corresponding to the second user displays the message.

Figure 12:
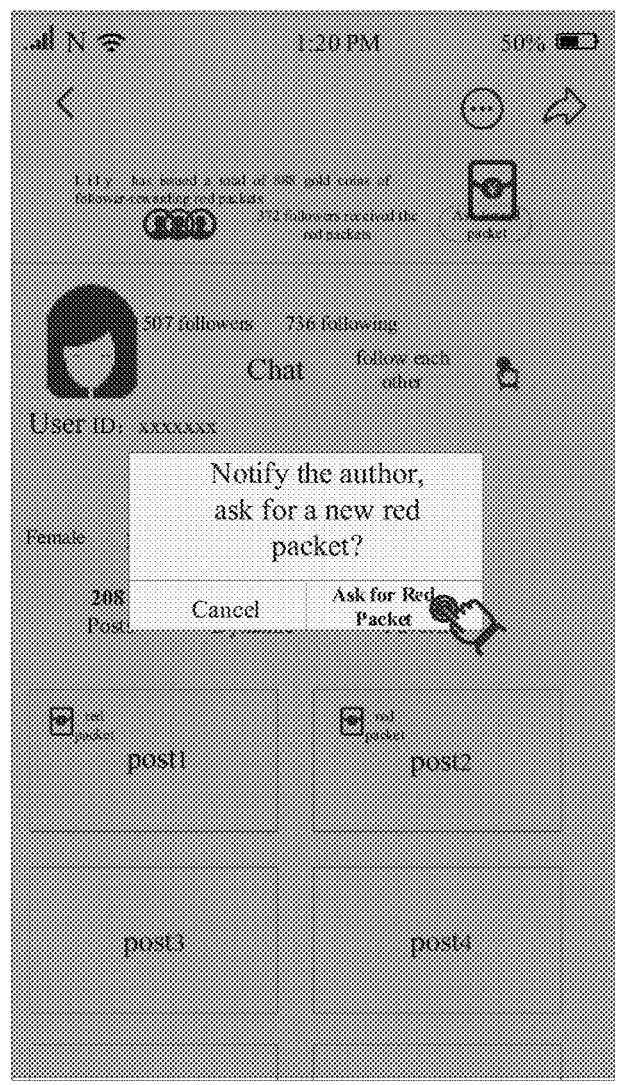
FIG. 12 is another schematic diagram showing another display of prompt information of a virtual resource request according to an example arrangement.

FIG. 12 is another schematic diagram showing a display of request prompt information of a virtual resource. The notification pop-up window shown in FIG. 12 can pop up in response to the first user tapping the control "Ask for Red packet" as shown in FIG. 3b, and the notification pop-up window displays "whether to notify the author to ask for a follower-rewarding red packet?", with two options "Cancel" and "Ask for Red packet" provided. If the first user taps on "Ask for Red packet", a red packet request message can be generated, and is sent to the terminal corresponding to the second user, so that the terminal corresponding to the second user can display the red packet request message on a message page of the interactive application in the form of a message. For specific display form, reference can be made to FIG. 11.

In some arrangements, the first user may only be allowed to request the virtual resource from the second user only once, and when the first user makes a request again, prompt information of "a message notification has been sent" may be display to prompt the first user.

In some arrangements, after the message for requesting the virtual resource is sent to the terminal corresponding to the second user, the virtual resource state control may also be updated to indicate a notified state.

In some arrangements, when the virtual resource state control indicates the notified state, the first user is prompted that the message has been sent in response to receiving the trigger operation by the first user on the virtual resource state control. In specific, in response to receiving the trigger operation by the first user on the virtual resource state control indicating the notified state, the prompt information for prompting that the message for requesting the virtual resource has already been sent may be displayed.

Figure 13:
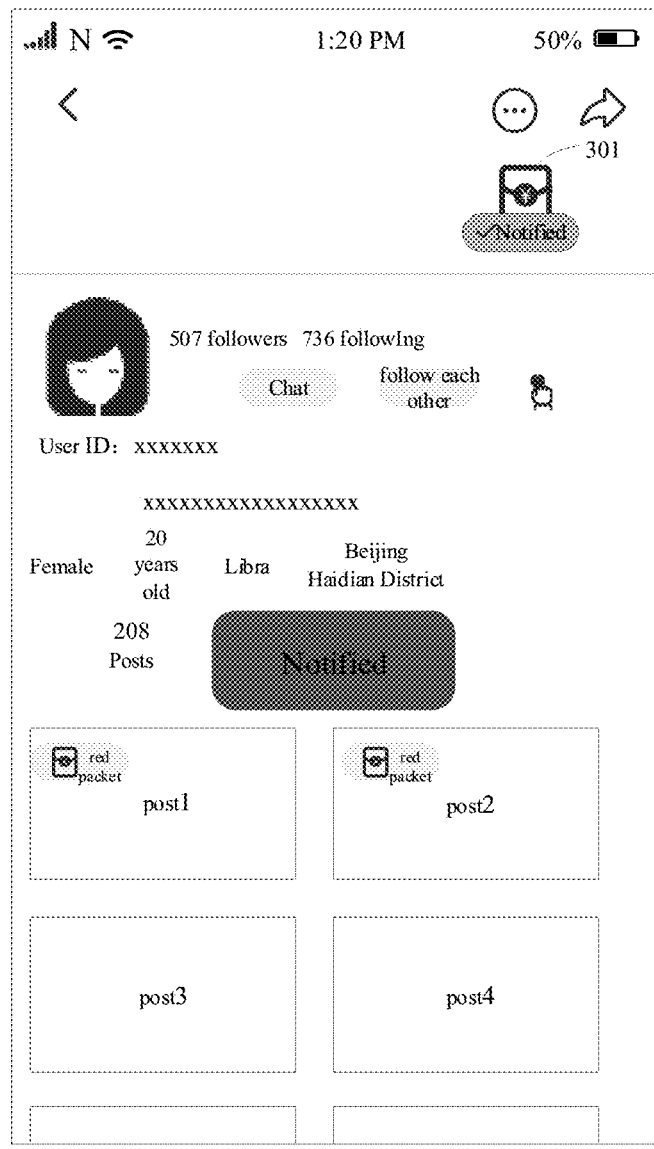
FIG. 13 is a schematic diagram showing an interactive interface of a second user including a virtual resource state control indicating a notified state according to an example arrangement.

FIG. 13 is a schematic diagram showing a display of a virtual resource state control indicating a notified state on a personal homepage. After the first user taps the control "Ask for Red packet" to send the red packet request message to the second user, a state of the red packet control on the personal homepage is updated from the state shown in FIG. 3b to the state shown in FIG. 13. By adding "notified" to indicate the notification state of the red packet control, in a case where the first user taps the red packet control added with "notified", a prompt message of "The message notification has been sent" can be displayed.

In some arrangements, the method may further include: updating the virtual resource state control to indicate the available state in response to a preset operation of the second user.

In some arrangements, the preset operation may include: posting multimedia data associated with the virtual resources or adjusting the virtual resources associated with the target multimedia resource to satisfy the first preset condition. For example, the quantity of virtual resources associated with the target multimedia resource is increased, so that the quantity reaches a preset quantity threshold, thus enabling the first user to acquire the virtual resources associated with the target multimedia resource.

In the arrangements of the present disclosure, the first user that is a visitor can acquire the virtual resources associated with the multimedia resources when accessing the interactive interface of the second user, which enriches the interactive mode, increases the fun of multimedia resource consumption in the interactive application, and improves the user's enthusiasm for viewing videos posted by other users, thus increasing the frequency of accessing the interactive application by the user, and increasing the user stickiness for the interactive application. In addition, by requesting the virtual resources from the second user, the interaction mode is further enriched, the interaction between the first user and the second user is enhanced, and the first user's enthusiasm for browsing the videos posted by other users in the interactive application is further improved with enhanced fun.

Figure 14:
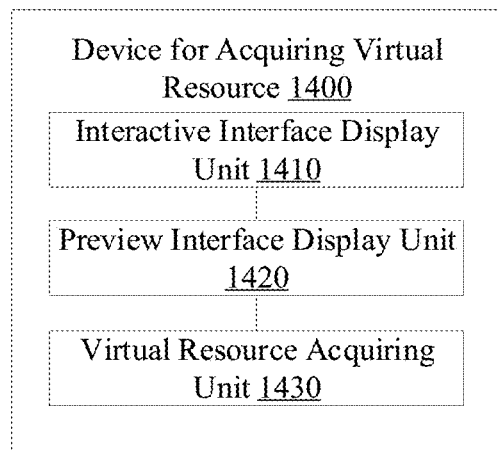
FIG. 14 is a block diagram showing a device for acquiring a virtual resource according to an example arrangement.

FIG. 14 is a block diagram showing a device $_{[YG2]}$for acquiring a virtual resource 1400 according to an example arrangement. With reference to FIG. 14, the device includes an interactive interface display unit 1410, a preview interface display unit 1420, and a virtual resource acquiring unit 1430.

The interactive interface display unit 1410 is configured to display an interactive interface of a second user in response to an access request of a first user for the interactive interface of the second user, where a virtual resource state control is displayed on the interactive interface.

The preview interface display unit 1420 is configured to display a preview interface of a target multimedia resource posted by the second user in response to a trigger operation on the virtual resource state control by the first user in a case where the virtual resource state control indicates an available state.

The virtual resource acquiring unit 1430 is configured to acquire a preset quantity of virtual resources from virtual resources associated with the target multimedia resource in response to a trigger operation on the preview interface by the first user.

In some arrangements, the device further includes:

a determining unit, configured to determine whether the virtual resources associated with the target multimedia resource satisfy a first preset condition; and a first message sending unit, configured to send a message for requesting the virtual resources to the second user in response to the trigger operation by the first user in a case where the virtual resources associated with the target multimedia resource do not satisfy the first preset condition, where the message is used for prompting the second user to issue the virtual resources.

In some arrangements, the device further includes:

a second message sending unit, configured to send a message for requesting the virtual resources to the second user in response to the trigger operation by the first user in a case where the virtual resource state control indicates a requesting state, where the message is used for prompting the second user to issue the virtual resources.

In some arrangements, the device further includes:

a first update unit, configured to update the virtual resource state control to indicate a notified state.

In some arrangements, the device further includes:

a sent message prompting unit, configured to prompt the first user that the message has been sent in response to receiving the trigger operation on the virtual resource state control by the first user in a case where the virtual resource state control indicates the notified state.

In some arrangements, the device further includes:

a second update unit, configured to update the virtual resource state control to indicate the available state in response to a preset operation of the second user.

In some arrangements, the preset operation includes: posting multimedia data associated with the virtual resources or adjusting the virtual resources associated with the target multimedia resource to satisfy the first preset condition.

In some arrangements, the device further includes:

a quantity acquiring unit, configured to acquire a total quantity of virtual resources that have been issued by the second user;

a user information acquiring unit, configured to acquire information of users that receive the issued virtual resources; and a displaying unit, configured to display the total quantity of the issued virtual resources and the information of the users that receive the issued virtual resources on a preset area of the interactive interface.

In some arrangements, the preview interface display unit 1420 includes:

a selecting unit, configured to select a multimedia resource posted most recently from multimedia resources posted by the second user that are associated with the virtual resources; and use the multimedia resource posted most recently as the target multimedia resource; and a preview interface display subunit, configured to display the preview interface of the target multimedia resource.

In some arrangements, the device further includes:

a first acquiring subunit, configured to acquire the preset quantity of virtual resources from the virtual resources associated with the target multimedia resource in a case where the virtual resources associated with the target multimedia resource satisfy the first preset condition.

In some arrangements, the virtual resource acquiring unit 1430 includes:

a second acquiring subunit, configured to acquire the preset quantity of virtual resources from the virtual resources associated with the target multimedia resource in a case where the first user satisfies a second preset condition.

Regarding the device in the foregoing arrangements, the specific manners for the modules to perform operations have been described in detail in the method arrangements, which will not be repeated here.

In some arrangements, there is also provided an electronic device, including a processor; and a memory for storing instructions executable by the processor; the processor is configured to execute the instructions stored in the memory to implement the method for acquiring the virtual resource in any of the foregoing arrangements.

Figure 15:
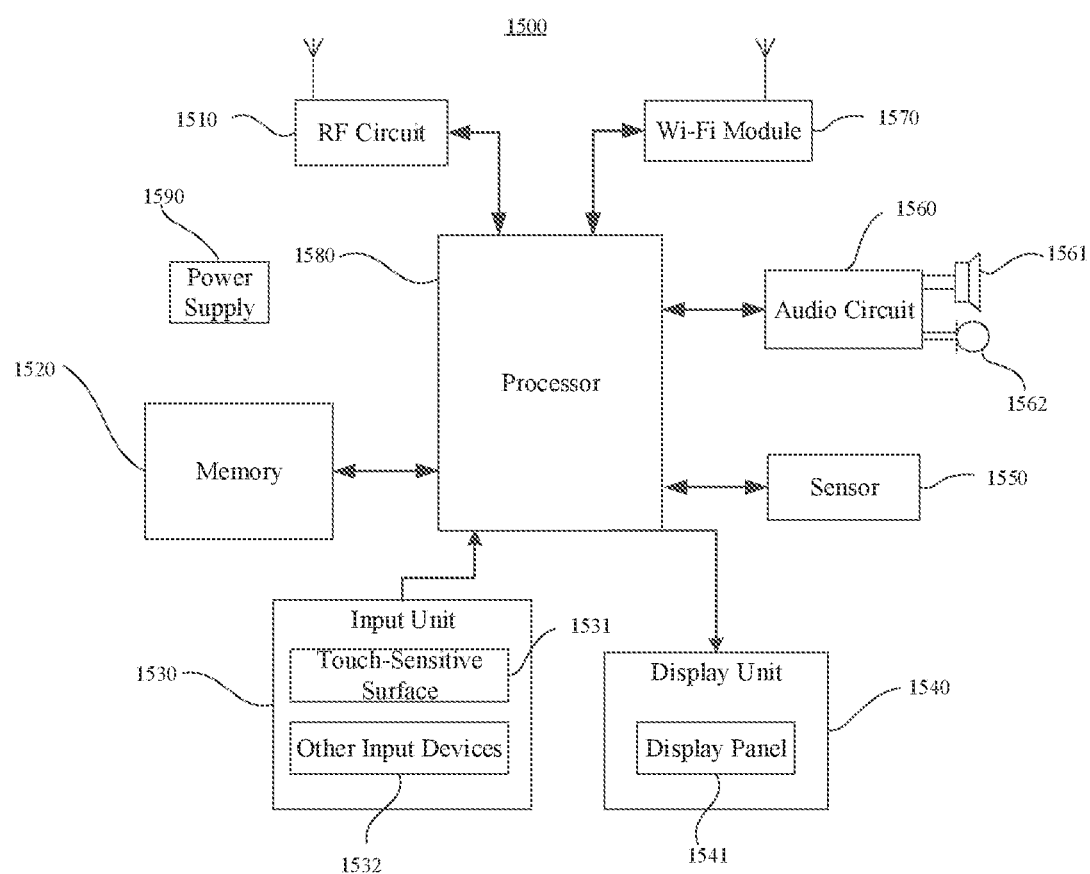
FIG. 15 is a block diagram showing an electronic device according to an example arrangement.

The electronic device may be a terminal, a server, or a similar computing device. Taking the terminal as an example of the electronic device, FIG. 15 is a block diagram of an electronic device for acquiring a virtual resource according to an example arrangement.

The terminal may include a Radio Frequency (RF) circuit 1510, a memory 1520 including one or more computer-readable storage media, an input unit 1530, a display unit 1540, a sensor 1550, an audio circuit 1560, a Wireless Fidelity (Wi-Fi) module 1570, a processor 1580 including one or more processing cores, a power supply 1590 and other components. Those skilled in the art can understand that the structure of the terminal shown in FIG. 15 is not a limitation on the terminal, and more or fewer components than those illustrated may be included, certain components may be combined, or different component arrangements may be used.

The RF circuit 1510 may be used to receive and send signals in the process of receiving and sending the information or in the call process, and particularly, after receiving downlink information from a base station, provide the information to one or more processors 1580 for processing; and in addition, send uplink-related data to the base station. Generally, the RF circuit 1510 includes but is not limited to an antenna, at least one amplifier, a tuner, one or more oscillators, a subscriber identity module (SIM) card, a transceiver, a coupler, a Low Noise Amplifier (LNA), a duplexer, and the like. Furthermore, the RF circuit 1510 can also communicate with a network and other terminals through wireless communication. The wireless communication may use any communication standard or protocol, including but not limited to: Global System of Mobile Communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), etc.

The memory 1520 may be used to store software programs and modules, and the processor 1580 performs various functional applications and data processing by running the software programs and modules stored in the memory 1520. The memory 1520 may mainly include a program storage area and a data storage area, the program storage area may store an operating system, applications required for the functions, and the like; and the data storage area may store the data created according to the use of the terminal, and the like. Furthermore, the memory 1520 may include a high speed random access memory, and may further include a non-volatile memory, e.g., at least one magnetic disk storage device, flash memory device, or other volatile solid-state storage devices. Correspondingly, the memory 1520 may further include a memory controller to provide the processor 1580 and the input unit 1530 with an access to the memory 1520.

The input unit 1530 may be used to receive input number or character information, and generate signal input of a keyboard, a mouse, a joystick, a cursor or a trackball related to the user settings and functional control. Specifically, the input unit 1530 may include a touch-sensitive surface 1531 and other input devices 1532. The touch-sensitive surface 1531, also called a touch screen or a touch pad, may collect touch operations of the user on or near it (for example, the operations of the user using any suitable object or accessory such as a finger or a touch pen on or near the touch-sensitive surface 1531), and drive a corresponding connection apparatus according to a preset program. In some arrangements, the touch-sensitive surface 1531 may include two parts: a touch detection device and a touch controller, where the touch detection device detects an orientation of touch by the user, detects a signal generated from the touch operation, and transmits the signal to the touch controller; and the touch controller receives the touch information from the touch detection device, converts it into touch point coordinates and then sends them to the processor 1580, and can also receive and execute the commands sent by the processor 1580. Furthermore, the touch-sensitive surface 1531 may be implemented in various types, such as a resistance type, a capacitive type, an infrared, a surface acoustic wave and other types. In addition to the touch-sensitive surface 1531, the input unit 1530 may further include other input devices 1532. Specifically, other input devices 1532 may include but are not limited to one or more of a physical keyboard, a function key (such as a volume control key, an on/off key, etc.), a trackball, a mouse, a joystick and the like.

The display unit 1540 may be used to display information input by the user or information provided to the user and various graphical user interfaces of the terminal. These graphical user interfaces may be composed of graphics, text, icons, videos, and any combination thereof. The display unit 1540 may include a display panel 1541, and in some arrangements, the display panel 1541 may be configured in the form of a Liquid Crystal Display (LCD), an Organic Light-Emitting Diode (OLED) or the like. Further, the touch-sensitive surface 1531 may cover the display panel 1541. When the touch-sensitive surface 1531 detects a touch operation on or near it, it transmits the touch operation to the processor 1580 to determine the type of touch event, and then the processor 1580 provides corresponding visual output on the display panel 1541 according to the type of the touch event. The touch-sensitive surface 1531 and the display panel 1541 can function as two independent components to realize the input and output functions of the terminal, but in some arrangements, the touch-sensitive surface 1531 and the display panel 1541 may be integrated to realize the input and output functions.

The terminal may also include at least one sensor 1550, such as a light sensor, a motion sensor, and other sensors. Specifically, the light sensor may include an ambient light sensor and a proximity sensor, where the ambient light sensor may adjust brightness of the display panel 1541 according to a light-dark intensity of the ambient light, and the proximity sensor may turn off the display panel 1541 and/or backlight when the terminal moves to the ear. As a type of motion sensor, a gravity accelerometer sensor can detect magnitudes of accelerations in individual directions (generally in three axes), detect the magnitude and direction of the gravity when it is stationary, and identify the applications of terminal gestures (such as horizontal and vertical screen switching, game-related, magnetometer gesture calibration) and identify the vibration-related functions (such as a pedometer and a tap), etc. As for the gyroscope, barometer, hygrometer, thermometer, infrared sensor and other sensors that may be configured in the terminal, the detailed description thereof will be omitted here.

The audio circuit 1560, the speaker 1561 and the microphone 1562 may provide audio interfaces between the user and the terminal. The audio circuit 1560 may convert the received audio data into an electrical signal and transmit it to the speaker 1561, and the speaker 1561 converts it into a sound signal for outputting; and in another aspect, the microphone 1562 converts the collected sound signal into an electrical signal; the audio circuit 1560 receives the electrical signal and converts it into the audio data, and then outputs the audio data to the processor 1580 for processing; and then the processor 1580 sends the audio data to, for example, another terminal via the RF circuit 1510, or outputs the audio data to the memory 1520 for further processing. The audio circuit 1560 may also include an earplug jack to provide communication between a peripheral earphone and the terminal.

The Wi-Fi belongs to the short-range wireless transmission technology, and the terminal may help the user to receive and send e-mails, browse web pages, access streaming media and the like through the Wi-Fi module 1570 which provides the user with the wireless broadband Internet access. Although FIG. 15 shows the Wi-Fi module 1570, it can be understood that it is not a necessary component of the terminal, and can be omitted as needed within the scope of not changing the essence the application.

The processor 1580 is the control center of the terminal, uses various interfaces and lines to connect various parts of the entire terminal, and executes various functions and processes data of the terminal by running or executing the software programs and/or modules stored in memory 1520 and invoking the data stored in memory 1520, so as to monitor the entire terminal. In some arrangements, the processor 1580 may include one or more processing cores; and the processor 1580 may preferably integrate an application processor and a modem processor, where the application processor mainly processes the operating system, user interface and application programs, etc., and the modem processor mainly processes the wireless communications. It can be understood that the foregoing modem processor may not be integrated into the processor 1580.

The terminal also includes a power supply 1590 (such as a battery) that supplies power to various components. In some arrangements, the power supply may be logically connected to the processor 1580 through a power management system, so as to realize functions such as charging, discharging, and power management through the power management system. The power supply 1590 may also include any component such as one or more DC or AC power supplies, a recharging system, a power failure detection circuit, a power converter or inverter, and a power state indicator.

Although not shown in the figures, the terminal may also include a camera, a Bluetooth module, etc., which will not be repeated here. Specifically, in some arrangements, the terminal further includes a memory and one or more programs. The one or more programs are stored in the memory and configured to be executed by one or more processors. The one or more programs include instructions for executing the method for acquiring the virtual resource provided by the above-mentioned method arrangements.

In some arrangements, there is also provided a computer storage medium Having stored thereon instructions which, when being executed by a processor of an electronic device, cause the electronic device to perform the method for acquiring the virtual resource provided in any of the foregoing arrangements.

In some arrangements, there is also provided a computer program product including a computer program/instruction which, when being executed by a processor, implements the method for acquiring the virtual resource provided in any of the foregoing arrangements.

Those skilled in the art can understand that all or part of the process in the method in any of the above arrangements can be completed by relevant hardware instructed by a computer program, and the computer program is stored in a non-volatile computer readable storage medium, the computer program may include the processes of the above-mentioned method arrangements when being executed. Any reference to the memory, storage, database, or other media used in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory can include a random access memory (RAM) or an external cache memory. By way of illustration but not limitation, the RAM is available in various forms, such as a static RAM (SRAM), a dynamic RAM (DRAM), a synchronous DRAM (SDRAM), a dual data rate SDRAM (DDR SDRAM), an enhanced SDRAM (ESDRAM), a synchronous Link (Synchlink) DRAM (SL-DRAM), a memory bus (Rambus) direct RAM (RDRAM), a direct memory bus dynamic RAM (DRDRAM), and a memory bus dynamic RAM (RDRAM).

Other arrangements of the present disclosure will be readily devised by those skilled in the art after consideration of the specification and practice of the present disclosure disclosed herein. The present disclosure is intended to cover any variations, uses, or adaptations of the present disclosure, which follow the general principles of the present disclosure and include common general knowledge or conventional technical means in the art that are not disclosed in the present disclosure. The specification and arrangements are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for acquiring a virtual resource, comprising:
in response to a request from a first user for accessing an interactive interface of a second user, displaying the interactive interface of the second user;
determining whether the second user posts a multimedia resource associated with virtual resources;
in response to determining that the second user posts the multimedia resource associated with the virtual resources, displaying, on the interactive interface, a virtual resource state control that indicates an available state;
displaying a preview interface of a target multimedia resource posted by the second user in response to a trigger operation on the virtual resource state control by the first user;
acquiring a preset quantity of virtual resources from virtual resources associated with the target multimedia resource in response to a trigger operation on the preview interface by the first user; and
sending a message for requesting the virtual resources to the second user in response to the trigger operation by the first user in a case where the virtual resources associated with the target multimedia resource do not satisfy a first preset condition, wherein the message is used for prompting the second user to issue the virtual resources.

2. The method according to claim 1, further comprising:
sending a message for requesting the virtual resources to the second user in response to the trigger operation by the first user in a case where the virtual resource state control indicates a requesting state, wherein the message is used for prompting the second user to issue the virtual resources.

3. The method according to claim 1, further comprising:
updating the virtual resource state control to indicate a notified state.

4. The method according to claim 3, further comprising:
prompting the first user that the message has been sent in response to receiving the trigger operation on the virtual resource state control by the first user in a case where the virtual resource state control indicates the notified state.

5. The method according to claim 3, further comprising:
updating the virtual resource state control to indicate the available state in response to a preset operation by the second user.

6. The method according to claim 5, wherein the preset operation comprises: posting multimedia data associated with the virtual resources, or adjusting the virtual resources associated with the target multimedia resource to satisfy the first preset condition.

7. The method according to claim 1, further comprising:
acquiring a total quantity of virtual resources that have been issued by the second user;
acquiring information of users that receive the issued virtual resources; and
displaying the total quantity of the issued virtual resources and the information of the users that receive the issued virtual resources on a preset area of the interactive interface.

8. The method according to claim 1, wherein said displaying the preview interface of the target multimedia resource posted by the second user comprises:
selecting a multimedia resource posted most recently from multimedia resources posted by the second user that are associated with the virtual resources;
determining the target multimedia resource based on the multimedia resource posted most recently; and
displaying the preview interface of the target multimedia resource.

9. The method according to claim 1, further comprising:
acquiring the preset quantity of virtual resources from the virtual resources associated with the target multimedia resource in a case where the virtual resources associated with the target multimedia resource satisfy the first preset condition.

10. The method according to claim 1, wherein said acquiring the preset quantity of virtual resources from the virtual resources associated with the target multimedia resource comprises:
acquiring the preset quantity of virtual resources from the virtual resources associated with the target multimedia resource in a case where the first user satisfies a second preset condition.

11. A device for acquiring a virtual resource, comprising:
a processor; and
a memory for storing instructions executable by the processor,
wherein the processor is configured to execute the instructions to:
display an interactive interface of a second user in response to a request from a first user for accessing the interactive interface of the second user;
determine whether the second user posts a multimedia resource associated with virtual resources;
in response to determining that the second user posts the multimedia resource associated with the virtual resources, display, on the interactive interface, a virtual resource state control that indicates an available state;
display a preview interface of a target multimedia resource posted by the second user in response to a trigger operation on the virtual resource state control by the first user;
acquire a preset quantity of virtual resources from virtual resources associated with the target multimedia resource in response to a trigger operation on the preview interface by the first user; and
send a message for requesting the virtual resources to the second user in response to the trigger operation by the first user in a case where the virtual resources associated with the target multimedia resource do not satisfy a first preset condition, wherein the message is used for prompting the second user to issue the virtual resources.

12. The device according to claim 11, wherein the processor is further configured to:
send a message for requesting the virtual resources to the second user in response to the trigger operation by the first user in a case where the virtual resource state control indicates a requesting state, wherein the message is used for prompting the second user to issue the virtual resources.

13. The device according to claim 12, wherein the processor is further configured to:
update the virtual resource state control to indicate a notified state.

14. The device according to claim 13, wherein the processor is further configured to:
prompt the first user that the message has been sent in response to receiving the trigger operation on the virtual resource state control by the first user in a case where the virtual resource state control indicates the notified state.

15. The device according to claim 13, wherein the processor is further configured to:
update the virtual resource state control to indicate the available state in response to a preset operation by the second user.

16. The device according to claim 15, wherein the preset operation comprises:
posting multimedia data associated with the virtual resources, or adjusting the virtual resources associated with the target multimedia resource to satisfy the first preset condition.

17. The device according to claim 11, wherein the processor is further configured to:
acquire a total quantity of virtual resources that have been issued by the second user;
acquire information of users that receive the issued virtual resources; and
display the total quantity of the issued virtual resources and the information of the users that receive the issued virtual resources on a preset area of the interactive interface.

18. A non-transitory computer-readable storage medium having stored thereon instructions which, when being executed by a processor of an electronic device, cause the electronic device to:
in response to a request from a first user for accessing an interactive interface of a second user, display the interactive interface of the second user;
determine whether the second user posts a multimedia resource associated with virtual resources;
in response to determining that the second user posts the multimedia resource associated with the virtual resources, display, on the interactive interface, a virtual resource state control that indicates an available state;
display a preview interface of a target multimedia resource posted by the second user in response to a trigger operation on the virtual resource state control by the first user;
acquire a preset quantity of virtual resources from virtual resources associated with the target multimedia resource in response to a trigger operation on the preview interface by the first user; and
send a message for requesting the virtual resources to the second user in response to the trigger operation by the first user in a case where the virtual resources associated with the target multimedia resource do not satisfy a first preset condition, wherein the message is used for prompting the second user to issue the virtual resources.

* * * * *